R. R. KIMBALL.
BED CONSTRUCTION.
APPLICATION FILED OCT. 20, 1913.
1,114,486.
Patented Oct. 20, 1914.
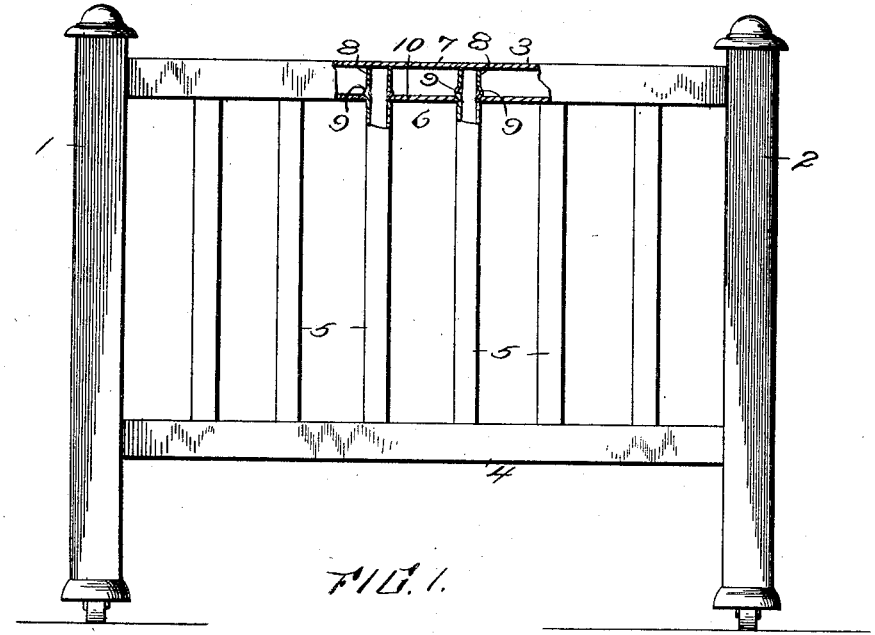
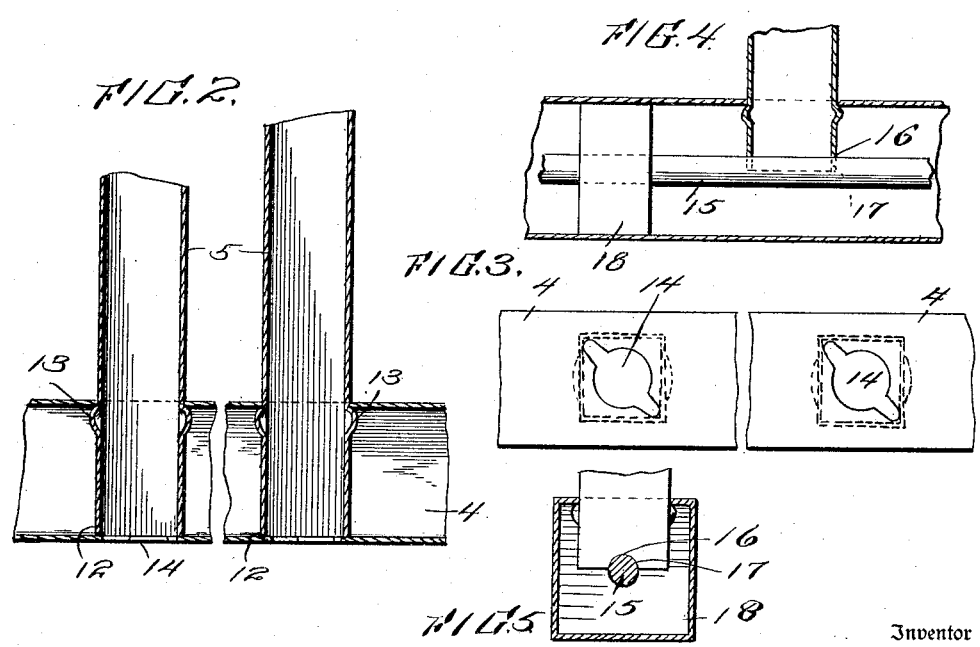
Witnesses
R. S. Trogner
W. H. Wakefield
Inventor
Ralph R. Kimball,
By Mason Fenwick & Lawrence
Attorneys

UNITED STATES PATENT OFFICE.

RALPH R. KIMBALL, OF CHICAGO, ILLINOIS.

BED CONSTRUCTION.

1,114,486.  Specification of Letters Patent.  Patented Oct. 20, 1914.

Application filed October 20, 1913. Serial No. 796,339.

*To all whom it may concern:*

Be it known that I, RALPH R. KIMBALL, a citizen of the United States, residing at Chicago, in the county of Cook and State of Illinois, have invented certain new and useful Improvements in Bed Construction; and I do hereby declare the following to be a full, clear, and exact description of the invention, such as will enable others skilled in the art to which it appertains to make and use the same.

This invention relates to bed construction, particularly the manner of securing filler bars between the cross bars in bed construction, and an object of the invention is to secure said filler bars to the rest of the bed construction without the use of bolts, nuts or any other additional means.

Another object of the invention is to provide a bed construction wherein the filler bars are so deformed as to lock with the cross bars of the bed construction.

A still further object of the invention is to provide a bed construction having filler bars the ends of which engage the cross bars so that by deforming a portion of the filler bars adjacent the cross bars, the filler bars may be held rigidly.

With these and other objects in view, the invention consists in certain novel constructions, combinations and arrangements of the parts which will be hereinafter fully described and claimed.

In the accompanying drawings wherein similar reference characters designate corresponding parts: Figure 1 is an end view of a bed construction employing the present invention; Fig. 2 is a vertical section through a portion of the bed showing the manner of deforming the filler bars; and Fig. 3 is a bottom plan of a portion of the lower cross bar; Fig. 4 is a vertical cross section of a modified form of the invention; Fig. 5 is a vertical cross section taken on line 5—5 of Fig. 4.

The general aim of the present invention is to provide a bed construction having filler bars the ends of which extend into substantially parallel hollow spaced cross bars so that the ends either engage the outer sides of the cross bars or engage other means rigid with the cross bars. Certain portions of the ends of the filler bars lying within the cross bars and in proximity to the adjacent sides of the cross bars are deformed or expanded so that the cross section is increased somewhat to prevent withdrawal of the filler bars. In order that the invention may be more completely understood, reference is to be had to the following description which concerns one embodiment of the invention.

Referring to the drawings, it will be seen that the bed construction consists of the end posts 1 and 2 between the upper ends of which extends a hollow cross bar 3, made preferably square in cross section as shown in the drawings, though not necessarily so, while a corresponding lower cross bar 4 extends between the lower ends of the end posts 1 and 2, and is made to correspond in appearance with cross bar 3. Filler bars 5 extend between the cross bars and are in some form other than a cylinder, a square form being shown in the drawing. By referring to Fig. 1, it will be seen that the lower side of the upper cross bar 3 is provided with a plurality of square openings 6 through which pass the upper ends of the square filler bars 5. In the preferred form of the invention the ends of the filler bars extend entirely through the cross bar and engage as at 8, the opposite or upper side 7 of the filler bar 3, which side 7 is remote from the lower cross bar 4. The sides of the ends within the cross bar 3 of each of the filler bars 5, the planes of which are substantially perpendicular to the cross bar 3, are provided with expanded portions 9 which are shown to increase the cross sectional area of the ends of the filler bars just inside of the lower side 10 of the cross bar 3. As shown, these bulges are not provided on the sides of the filler bars which are substantially parallel to the cross bars, although they may be provided there if desired. The lower end of each of the filler bars is formed after a manner similar to the upper end, the lower ends extending through to the top side 11 of the lower cross bar 4 and engaging the bottom side 11' as at 12. Projections 13 similar to expanded portions 9 are formed upon the lower ends of the filler bars just inside of the cross bar 4. It will be understood from this construction that each end of each of the filler bars engages each of the cross bars in two points, so that a rigid construction is provided.

It will be understood that the bulgers or projections formed on the filler bars can be produced after the latter have had their ends inserted into the cross bars and as illustrating one means of producing these bulgers, the lower side 11' of the lower cross bar 4 is provided with a plurality of diagonally disposed slots 14 formed substantially as shown in the drawings having an enlarged central portion. It will be possible that by the use of an appropriate tool the end of which conforms approximately to the slot 14, to insert said tool through the slot and turn the same about one-eighth of a turn, which will bulge the opposite sides of the filler bars. Any kind of tool may be used for producing this, and it will be understood that this one-eighth turn produces a bulger sufficient in some instances to hold the bars together, but in order to produce a complete bulger, it will be desirable to continue the rotation of the tool through another eighth turn. By referring to Fig. 3, it will be seen that the ends of the slot 14 are adjacent diagonally opposite corners of the filler bars 5, but do not extend as far as the sides of the filler bars, so that the sides of the filler bars are always braced on the bottom despite the presence of the slots 14.

In the modified form of the invention shown in Fig. 4, I have shown a rigid rod 15 which may be connected in any way to the ends of the cross bar, and in this form the ends 16 of the filler bars are made to abut the cross bar 15. If desired the filler bars may have the opposite parallel sides of the ends thereof slotted as at 17, so as to prevent turning, in which event it will be possible to make the filler bars cylindrical or in any other shape. Supporting blocks 18 may be spaced in the cross bars for the purpose of giving the necessary rigidity to the rods 15. It may be desirable under certain circumstances where the slots 17 are used, to dispense with the blocks 18, although the two may be used in conjunction.

Thus it will be seen that a bed construction is provided which does not require the use of any auxiliary equipment such as bolts, nuts, wedges, etc., but that the construction is made rigid solely by deforming the filler bars, and having their ends engage the cross bars. Also inasmuch as the bulgers or projections are placed as described, they serve to form effective means for preventing unsteadiness of the bed construction, inasmuch as the bulgers are formed upon the filler bar sides, the angular position of which with respect to the cross bars would be changed should distortion of the bed construction occur.

What I claim is:

In a bed construction a hollow crossbar provided with an opening in one side, a filler bar passing through said opening and engaging the opposite side of the crossbar, the entire end of the filler bar engaging the crossbar and being formed complementarily with respect to said crossbar, and bulged portions formed upon the filler bar extending outwardly therefrom and engaging the interior face of the crossbar.

In testimony whereof I affix my signature in presence of two witnesses.

RALPH R. KIMBALL.

Witnesses:
 ROBT. T. LANG,
 W. H. WAKEFIELD.

---

Copies of this patent may be obtained for five cents each, by addressing the "Commissioner of Patents, Washington, D. C."